(12) United States Patent
Hilmann

(10) Patent No.: US 11,005,134 B2
(45) Date of Patent: May 11, 2021

(54) ELECTRIFIED VEHICLE WITH BATTERY PROTECTION DEVICE AND CORRESPONDING METHOD

(71) Applicant: Ford Global Technologies, LLC, Dearborn, MI (US)

(72) Inventor: Joergen Hilmann, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 16/217,758

(22) Filed: Dec. 12, 2018

(65) Prior Publication Data

US 2019/0214615 A1 Jul. 11, 2019

(30) Foreign Application Priority Data

Jan. 5, 2018 (DE) .................. 102018200116.2

(51) Int. Cl.
| | |
|---|---|
| *H01M 50/20* | (2021.01) |
| *B60L 50/64* | (2019.01) |
| *B21D 5/16* | (2006.01) |
| *B60K 6/28* | (2007.10) |

(52) U.S. Cl.
CPC ............. *H01M 50/20* (2021.01); *B21D 5/16* (2013.01); *B60K 6/28* (2013.01); *B60L 50/64* (2019.02); *B60Y 2200/91* (2013.01); *B60Y 2200/92* (2013.01); *H01M 2220/20* (2013.01)

(58) Field of Classification Search
CPC .......... H01M 2/10; H01M 50/20; B60L 50/64
See application file for complete search history.

(56) References Cited

U.S. PATENT DOCUMENTS

| 8,637,173 B2 | 1/2014 | Koh | |
|---|---|---|---|
| 2007/0141454 A1* | 6/2007 | Marukawa | H01M 2/1083 429/120 |
| 2012/0183828 A1 | 7/2012 | van den Akker | |
| 2013/0004822 A1* | 1/2013 | Hashimoto | H01M 10/6554 429/120 |
| 2013/0130086 A1* | 5/2013 | Schaefer | H01M 2/202 429/120 |

(Continued)

FOREIGN PATENT DOCUMENTS

| CN | 201111306 Y | 9/2008 |
|---|---|---|
| CN | 203674294 U | 6/2014 |
| CN | 205542942 U | 8/2016 |

(Continued)

OTHER PUBLICATIONS

Rong et al. CN 203674294. Jun. 25, 2014. English machine translation. (Year: 2014).*

(Continued)

*Primary Examiner* — James Lee
(74) *Attorney, Agent, or Firm* — David B. Kelley; Carlson, Gaskey & Olds, P.C.

(57) ABSTRACT

The present disclosure relates to an electrified vehicle with a battery protection device and a corresponding method. An example electrified vehicle includes a battery protection device with a first housing portion and a second housing portion. The first and second housing portions are each made of a sandwich structure and exhibit U-shaped profiles. The U-shaped profiles of the first and second housing portions face one another to provide an internal cavity.

17 Claims, 4 Drawing Sheets

(56) References Cited

U.S. PATENT DOCUMENTS

2016/0111694 A1   4/2016   Doornekamp et al.

FOREIGN PATENT DOCUMENTS

| DE | 102011016799 A1 | 3/2012 |
| DE | 102011002650 A1 | 7/2012 |
| DE | 102011111229 A1 | 2/2013 |
| DE | 202014008335 U1 | 1/2016 |
| DE | 102017000263 A1 | 7/2017 |
| EP | 3252846 A1 | 12/2017 |

OTHER PUBLICATIONS

Research News, "Crash-safe Battery Protection for Electric Cars," Fraunhofer-Gesellschaft, Research News Sep. 2011—Topic 4, downloaded from https://www.fraunhofer.de/en/press/research-news/2011/september/battery-protection.html on Nov. 16, 2018.

* cited by examiner

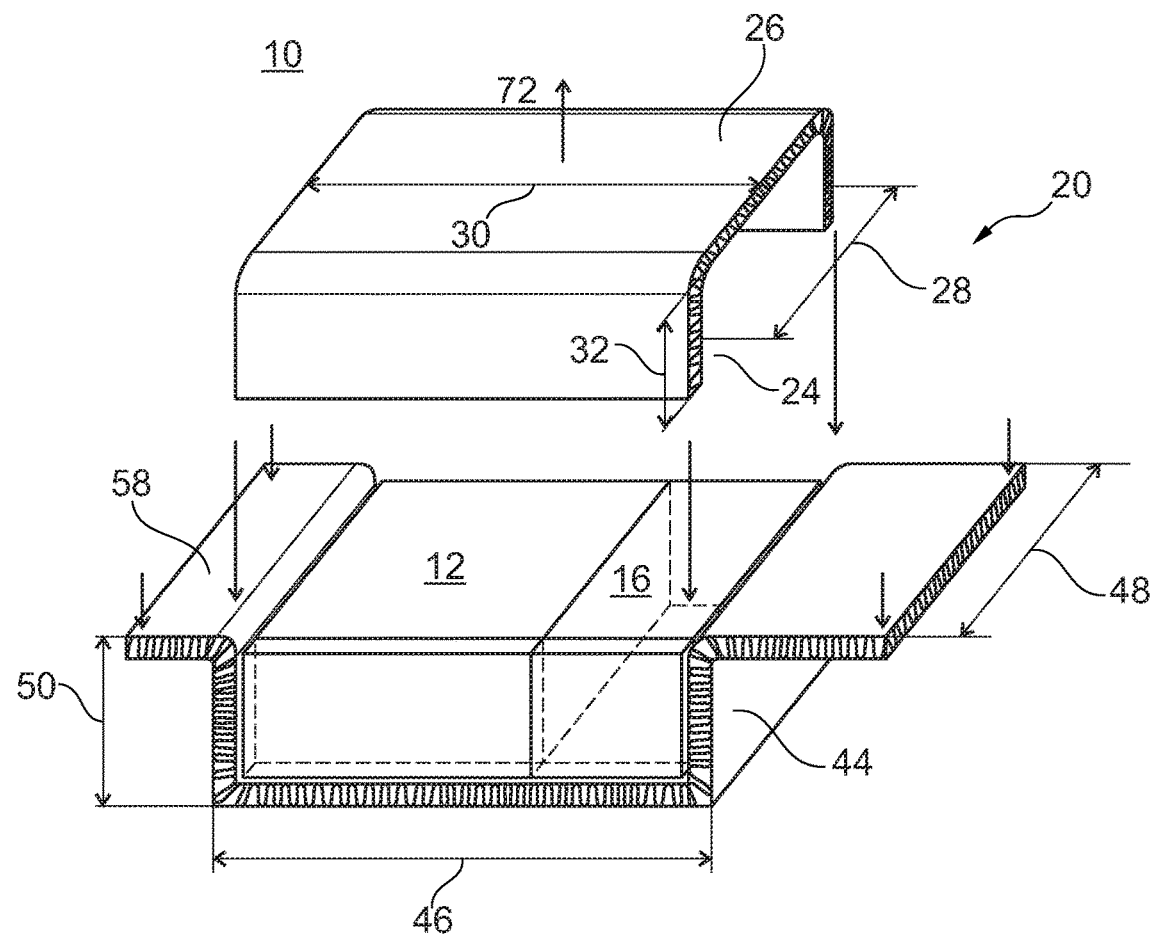
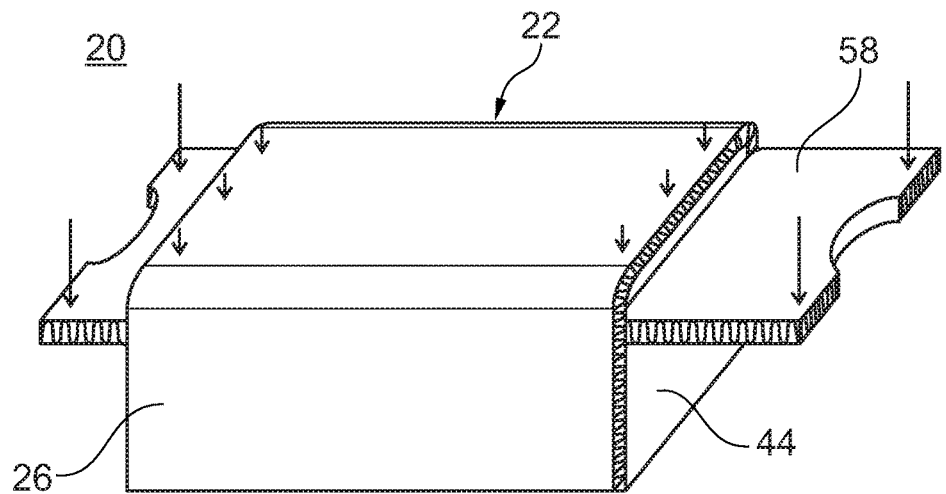
Fig. 2

ELECTRIFIED VEHICLE WITH BATTERY PROTECTION DEVICE AND CORRESPONDING METHOD

RELATED APPLICATION(S)

This application claims priority to German Patent Application No. 102018200116.2, filed on Jan. 5, 2018, the entirety of which is herein incorporated by reference.

TECHNICAL FIELD

The present disclosure relates to an electrified vehicle with a battery protection device and a corresponding method.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

Electrified vehicles include rechargeable batteries, which are used as a main power source for the electric machine, such as the electric drive of a hybrid electric vehicle (HEV). Due to the amount of energy storable in the rechargeable batteries, the rechargeable batteries must be sufficiently impact resistant. A number of protection devices for rechargeable batteries are known in the prior art.

For example, U.S. Pat. No. 8,637,173 describes a battery pack with guide recesses which are arranged in a housing. The battery pack includes a battery core with a non-insulated cell and a protective circuit connected electrically to the non-insulated cell, a housing which receives the battery core and an upper cover which covers the battery core. The housing includes a base plate, reinforcement plates which extend vertically from the edges of the base plate and a synthetic resin part which surrounds the reinforcement plates. A guide recess is arranged inside the synthetic resin part. The reinforcement plates are bent at least once and can be realized such that at least two edges face one another (i.e., each reinforcement side wall can be folded back on itself).

CN 201111306 relates to a battery housing and to a battery pack. The housing has an upper housing and a lower housing, both of which are cylindrically-shaped. Specifically, the upper housing includes cylindrical tube and a through-hole. An upper plate is arranged fixedly on the top side of the upper cylindrical tube, and the through-hole is arranged on the wall of the upper cylindrical tube. The lower housing comprises a lower cylindrical tube, a shell and a blower. The shell comprises a plurality of air inlet holes and is also arranged fixedly inside the lower cylindrical tube of the lower part of the lower housing. The blower, which is arranged below the air inlet holes of the shell, is fixedly connected to the shell. The battery pack includes a battery pack holder, a cathode and an anode wire and an assembled battery core which is arranged in the battery pack container. A cathode and an anode of the assembled battery core are electrically connected to one end of the cathode wire or of the anode wire, and the other end of the cathode wire or of the anode wire extends through the upper plate in order to guide the wire into an outer space of the battery pack container.

Another known arrangement is described in CN 205542942. A battery impact protection housing comprises an energy absorption layer which is fixed on the battery housing by means of securing points. The housing may further include a reinforcement rib structure.

A corrugated sandwich protection structure for a housing of a battery of an electric vehicle is thus described, for instance, in CN 203674294. The corrugated sandwich protection structure of the housing of the battery of the electric vehicle includes a box body and a box cover. The box body is provided with an open top surface and consists of a base plate and a base wall plate, which is secured to the periphery of the base plate. The box body is used to receive a battery. The box cover includes a top plate and a top wall plate, which is secured to the periphery of the top plate. The box cover and the box body are buckled together to form an air-tight space.

In addition, U.S. 2012/0183828 describes an HEV with a battery which is arranged between two wheel housings. An elongated protection element is provided between the wheel housings in the region of the battery in case of a side impact. The elongated protection element can be a sandwich plate having two top plates with a core produced from rigid foam. The rigid foam, produced from a foamed plastics material, can be replaced by a metal foam, such as an aluminum foam. Alternatively, the sandwich plate can consist of two top plates which surround a core of corrugated sheet metal, the wavy line of the core extending transversely to the longitudinal axis of the sandwich plate. Such sandwich plates are commercially available, for example under the trade name of Metawell®.

A further proposal of a battery protection device is disclosed in an article entitled "Crash-safe Battery Protection for Electric Cars" by the Fraunhofer Society. The article describes a battery housing produced from fiber-reinforced composites, which are both lightweight and impact resistant. In particular, the battery housing ensures the intactness of the battery located therein at impact speeds of up to 60 kph (about 37 mph) while also protecting the battery from moisture. Further, a semi-permeable membrane arranged in the battery housing enables pressure equalization as a result of gas exchange.

SUMMARY

An electrified vehicle according to an exemplary aspect of the present disclosure includes, among other things, a battery protection device including a first housing portion and a second housing portion. The first and second housing portions are each made of a sandwich structure and exhibit U-shaped profiles. The U-shaped profiles of the first and second housing portions face one another to provide an internal cavity.

In a further non-limiting embodiment of the foregoing electrified vehicle, the U-shaped profiles of the first and second housing portions are arranged substantially 90° relative to one another.

In a further non-limiting embodiment of any of the foregoing electrified vehicles, the first housing portion includes a base and opposed side walls providing the first housing portion with the U-shaped profile, and the second housing portion includes a base and opposed side walls providing the second housing portion with the U-shaped profile.

In a further non-limiting embodiment of any of the foregoing electrified vehicles, the side walls of the first and second housing portions bound the sides of the internal cavity, the base of the first housing portion bounds one of the top and the bottom of the internal cavity, and the base of the second housing portion bounds the other of the top and the bottom of the internal cavity.

In a further non-limiting embodiment of any of the foregoing electrified vehicles, the first housing portion is a lower housing portion and comprises an overhang protruding substantially perpendicularly from one of the side walls of the first housing portion.

In a further non-limiting embodiment of any of the foregoing electrified vehicles, at least one of the side surfaces of the first housing portion comprises a through opening.

In a further non-limiting embodiment of any of the foregoing electrified vehicles, a width of the U-shaped profile of the second housing portion substantially corresponds to a length of the U-shaped profile of the first housing portion, and a length of the U-shaped profile of the second housing portion substantially corresponds to a width of the U-shaped profile of the first housing portion.

In a further non-limiting embodiment of any of the foregoing electrified vehicles, the length of the U-shaped profile of the first housing portion substantially corresponds to an inner width of the U-shaped profile of the second housing portion, and the length of the U-shaped profile of the second housing portion substantially corresponds to an outer width of the U-shaped profile of the first housing portion.

In a further non-limiting embodiment of any of the foregoing electrified vehicles, an inner height of the U-shaped profile of the second housing portion substantially corresponds to an outer height of the U-shaped profile of the first housing portion.

In a further non-limiting embodiment of any of the foregoing electrified vehicles, the sandwich structures of the first and second housing portions comprise one of (a) a core layer including a metal honeycomb structure, (b) a metal corrugated structure having corrugations extending in the direction of a length of the U-shaped profile of the respective one of the first and second housing portions, and (c) a polymer rigid foam material.

In a further non-limiting embodiment of any of the foregoing electrified vehicles, the sandwich structures of the first and second housing portions predominantly comprise one of (a) expanded polypropylene, (b) aluminum, and (c) steel.

In a further non-limiting embodiment of any of the foregoing electrified vehicles, the electrified vehicle further includes at least one foam plate arranged within the internal cavity.

In a further non-limiting embodiment of any of the foregoing electrified vehicles, the electrified vehicle further includes a fan unit arranged within the internal cavity.

In a further non-limiting embodiment of any of the foregoing electrified vehicles, the electrified vehicle further includes a battery arranged within the internal cavity.

In a further non-limiting embodiment of any of the foregoing electrified vehicles, the electrified vehicle further includes an electric machine. The battery is configured to power the electric machine, and the electric machine is configured to provide a rotational output to drive the electrified vehicle.

A method according to an exemplary aspect of the present disclosure includes, among other things, forming a first component into a first housing portion exhibiting a U-shaped profile, forming a second component into a second housing portion exhibiting a U-shaped profile, and arranging the U-shaped profiles of the first and second housing portions to face one another to provide an internal cavity.

In a further non-limiting embodiment of the foregoing method, the step of forming the forming the first component into the first housing portion includes bending ends of the first component toward one another along two parallel, spaced-apart bending lines, and the step of forming the forming the second component into the second housing portion includes bending ends of the second component toward one another along two parallel, spaced-apart bending lines.

In a further non-limiting embodiment of any of the foregoing methods, the method includes bending the bent ends of the first housing portion about two parallel, spaced-apart bending lines in a direction away from one another to provide projections extending from the remainder of the bent ends.

In a further non-limiting embodiment of any of the foregoing methods, the arranging step includes rotating one of the first and second housing portions such that the U-shaped profiles of the first and second housing portions are arranged substantially 90° relative to one another, and such that sides of the first and second housing portions provide side walls for the internal cavity.

In a further non-limiting embodiment of any of the foregoing methods, the method includes arranging a battery within the internal cavity, wherein the battery is configured to power an electric machine.

BRIEF DESCRIPTION OF THE DRAWINGS

FIG. 1 is a perspective view of a schematic representation of a battery module with a battery protection device in the open state.

FIG. 2 is a perspective view of the schematic representation of the battery module battery housing of the battery protection device of FIG. 1 in a closed state.

DETAILED DESCRIPTION

Figure 3:
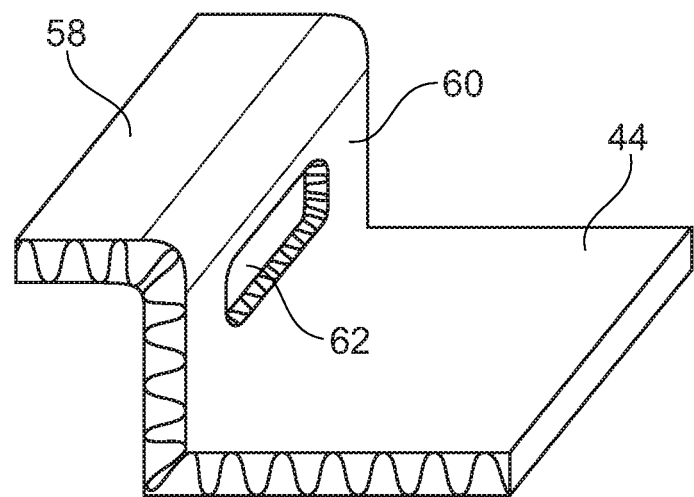
FIG. 3 shows a schematic representation of a detail of the battery protection device of FIG. 1.

The present disclosure relates to an electrified vehicle with a battery protection device and a corresponding method. An example electrified vehicle includes a battery protection device with a first housing portion and a second housing portion. The first and second housing portions are each made of a sandwich structure and exhibit U-shaped profiles. The U-shaped profiles (i.e., the sections of the first and second housing portions which exhibit a U-shaped form in cross-section) of the first and second housing portions face one another to provide an internal cavity. The battery protection device is lightweight, relatively easily made, while also providing increased battery protection. These and other benefits will be appreciated from the following description.

The battery protection device according to this disclosure comprises a battery housing with an internal cavity for receiving a rechargeable battery for mobility applications. The internal cavity of the battery protection device is defined by two housing portions, namely an upper housing portion and a lower housing portion of the battery housing. Both the upper housing portion and the lower housing portion comprise a sandwich structure and are each realized in the form of a U-shaped profile, meaning they generally resemble a U in cross-section.

In one example, the U-shaped profile of the upper housing portion comprises an inner width which corresponds substantially to a length of the U-shaped profile of the lower housing portion. The U-shaped profile of the upper housing portion additionally comprises a length which corresponds substantially to an outer width of the U-shaped profile of the lower housing portion. Furthermore, an inner height of the U-shaped profile of the upper housing portion corresponds substantially to an outer height of the U-shaped profile of the lower housing portion. The term "corresponds substantially" is to be understood in this disclosure as an amount of a difference between the two relevant sizes being smaller than a thickness of a wall defining the U-shaped profile of the lower housing portion.

The disclosed battery protection device can absorb a force acting locally from any direction on the upper housing portion or the lower housing portion in the event of an impact and can divert it into a larger surface area of the upper housing portion or of the lower housing portion in order to reduce effective local surface pressure, as a result of which damage to a rechargeable battery can be largely prevented. In addition, the battery protection device comprises a particularly high level of torsion rigidity on account of its construction. In addition, the proposed battery protection device has a simple design and can consequently be produced in a simple manner.

This disclosure is usable in the field of vehicle engineering, in particular automotive engineering. A "vehicle" is to be understood in terms of this disclosure in particular as a passenger vehicle, a heavy goods vehicle or an autobus. This disclosure extends to all types of electrified vehicles, including battery electric vehicles (BEVs) and all types of hybrid electric vehicles (HEVs), such as full hybrids, parallel hybrids, series hybrids, mild hybrids, and micro hybrids, among others.

With the battery protection device in an installed state, the U-shaped profile form of the upper housing portion is rotated by 90° in relation to the U-shaped profile form of the lower housing portion and is turned upside down such that the open sides of the U-shaped profile are opposite one another. To form the internal cavity, the upper housing portion is placed onto the lower housing portion until the insides of the U-shaped profile of the upper housing portion directly abut against at least parts of the end faces of the U-shaped profile of the lower housing portion.

In an embodiment of the battery protection device, the lower housing portion comprises an overhang which protrudes perpendicularly from side surfaces of U-shaped profile on side of the U-shaped profile form. As a result, the battery protection device can be mounted in a vehicle in a simple manner A further advantage is that the length of the upper housing portion can be chosen in such a manner that the upper housing portion is situated in the installed state so as to abut mechanically against the two overhangs on longitudinal edges of the U-shaped profile form, and is additionally supported by said overhangs against forces which act on the upper housing portion in the direction of the length.

The overhangs may be rectangular plates, as a result of which good support of the upper housing portion can be achieved. In particular, the overhangs may comprise a sandwich structure. The sandwich structure can correspond to the sandwich structure of the upper housing portion or of the lower housing portion, or both.

The overhangs on the longitudinal edges of the U-shaped profile of the lower housing portion may be integral with remainder of the lower housing portion, as a result of which particularly high torsional rigidity of the battery protection device can be achieved.

In further embodiments of the battery protection device, side surfaces of the lower housing portion each comprise at least one through-opening. In this way, simple ventilation of the internal cavity of the battery protection device can be made possible to cool the rechargeable battery.

At least one foam plate may be arranged inside the internal cavity and parallel to and close to one of the inner side surfaces of the upper housing portion. In this way, the local surface pressure generated in the event of an impact as a result of the force acting locally on the upper housing portion and/or the lower housing portion is further reduced.

The at least one foam plate can consist of soft foam or rigid foam. The at least one foam plate can comprise a substantially rectangular form. The term "substantially rectangular" is to be understood in terms of this disclosure in particular as a deviation of an amount of a surface of the foam plate from an amount of a minimum rectangular form which surrounds the foam plate of less than 20%, and may be less than 15% or 10%.

Introducing the acting force into a larger surface area and consequently a reduced surface pressure can be achieved in a particularly efficient manner when the at least one foam plate is situated so as to directly abut against a side surface of the upper housing portion.

In embodiments of the battery protection device, the sandwich structure of the upper housing portion and the sandwich structure of the lower housing portion comprise a core layer which includes a metal honeycomb structure, a metal corrugated structure having corrugations extending in a length direction, or a polymer rigid foam material. Semi-finished products with a sandwich structure and such a core layer are commercially available (e.g., Metawell®, ARPRO®) and can enable the battery protection device to be designed in a lightweight manner. The sandwich structure of the upper housing portion and the sandwich structure of the lower housing portion can be made of the same material or different materials.

At least one of the core layers of the sandwich structure of the upper housing portion and of the sandwich structure of the lower housing portion may predominantly comprise expanded polypropylene (EPP), as a result of which it is possible to achieve a particularly low weight of the housing part. The term "predominantly comprise" is to be understood in this disclosure as a proportion of more than 50% of a component by volume and includes the possibility of the predominant part being 100% of the component by volume.

In embodiments of the battery protection device, the sandwich structure of the upper housing portion and the sandwich structure of the lower housing portion predominantly comprise aluminum or steel. The battery protection device for mobility applications can be provided with sufficient strength in this manner.

The internal cavity of the battery protection device, in one particular example, is designed for receiving a rechargeable battery with a power output of up to 15 kW. Such rechargeable batteries are suitable, in particular, for use in small vehicles, where it is naturally more difficult to identify an installation space which is not impaired should an impact occur. The disclosed battery protection device can provide sufficient mechanical protection for the rechargeable battery in these cases. It should be understood that the disclosed battery protection device is not limited to use with batteries of a certain size, however.

A method for producing the disclosed battery protection device is proposed in a further aspect of the disclosure. The method will be discussed below with reference to FIG. 6.

A discussion of the figures follows. Identical component parts are provided with the same reference symbols in the various figures, and thus they are generally only described once.

FIG. 1 shows a perspective, schematic view of an embodiment of a battery module 10 in the open state.

The battery module 10 includes a rechargeable battery 12 for use in a motor vehicle such as an electrified vehicle, a fan unit 16, and a battery protection device 20 for ensuring the integrity of the rechargeable battery 12 should an impact occur.

The mechanical battery protection device 20 includes a battery housing 22 (FIG. 2) with an internal cavity 24 (FIG. 1) for receiving the rechargeable battery 12 and the fan unit 16 with at least one electrically operable fan (not shown). The internal cavity 24 is defined and limited (i.e., bound) by an upper housing portion 26 and a lower housing portion 44 of the battery housing 22. Specifically, the internal cavity 24 is defined and limited by the U-shaped profiles of the upper and lower housing portions 26, 44. The upper housing portion 26 and the lower housing portion 44 both comprise a sandwich structure and are realized in the form of a U-shaped profile, which, again, means that they generally exhibit a U-shape in cross-section.

The U-shaped profile of the upper housing portion 26 is turned upside down in relation to the U-shaped profile form of the lower housing portion 44 such that the open sides of the two U-shaped profiles face one another.

The U-shaped profile of the upper housing portion 26 comprises an inner width 28 and a length 30, and the U-shaped profile form of the lower housing portion 44 comprises an outer width 46 and a length 48.

Relative to the upper housing portion 26, the inner width 28 is measured between inner surfaces of the side walls of the upper housing portion 26. The length 30 is equivalent to the length measured between ends of a base of the upper housing portion 26. The base extends substantially normal to the side walls. Together, the base and side walls provide the upper housing portion with a U-shaped profile.

The inner width 28 of the upper housing portion 26 corresponds to the length 48 of the lower housing portion 44. The outer width 46 of the lower housing portion 44 corresponds to the length 30 of the upper housing portion 26. The outer width is measured between outer surfaces of the side walls of the lower housing portion 44. The length 48, on the other hand, is measured between ends of the base of the lower housing portion 44. The base extends substantially normal to the side walls, and together the base and side walls provide the lower housing portion 44 with a U-shaped profile.

Further, an inner height 32 of the profile of the upper housing portion 26 and an outer height 50 of the profile of the lower housing portion 44 are substantially the same size.

To form the internal cavity 24, the U-shaped profile of the upper housing portion 26 is rotated by 90° in relation to the U-shaped profile of the lower housing portion 44. Specifically, the U-shaped profile of the upper housing portion 26 is rotated about a direction 72 arranged perpendicularly to a base of the upper housing portion 26, and is placed so as to directly abut against parts of the end faces of the U-shaped profile of the lower housing portion 44. A closed installation state of the battery protection device 20 is shown schematically in FIG. 2.

In a further aspect of this disclosure, each of the longitudinal edges of the U-shaped profile of the lower housing portion 44 comprises an overhang 58 which protrudes perpendicularly from sides of the U-shaped profile and serves for mounting the battery protection device 20 in the vehicle. In the closed installation state, longitudinal edges of the profile form of the upper housing portion 26 are situated so that they directly abut against the two overhangs 58 and are supported mechanically by the overhangs 58.

In a possible embodiment of the battery protection device 20, the sandwich structure of the upper housing portion 26 includes top layers 34, 36 which are produced from aluminum and a core layer 38 (FIG. 5) which includes a metal corrugated structure, the crests of the corrugation of the corrugated structure being arranged parallel to the respective length of the U-shaped profile. The sandwich structure of the lower housing portion 44 also includes top layers 52, 54 which are produced from aluminum and a core layer 56 which is realized identically to the core layer 38 of the sandwich structure of the upper housing portion 26. The sandwich structures have the advantages of being high strength, being durable, providing a high level of shock resistance, providing a high level of earthquake resistance, providing good absorption of impact energy, and having a low weight, etc.

In other embodiments, the sandwich structure of the upper housing portion 26 and the sandwich structure of the lower housing portion 44 can be realized differently from one another. The sandwich structure of the upper housing portion 26 and/or the sandwich structure of the lower housing portion 44 can include top layers which can include, for example, other metals, for example steel, and the core layer can consist predominantly of a polymer rigid foam material, for example of expanded polypropylene (EPP).

FIG. 3 shows a schematic view of a detail of a side surface 60 of the lower housing portion 44 of the battery housing 22 of the battery protection device 20. In an embodiment of this disclosure, one or both side surfaces 60 of the lower housing portion 44 may comprise a substantially rectangular though-opening 62, only one of which is shown in FIG. 3.

As can be seen from FIGS. 1 (at the top) and 4, the rechargeable battery 12 and the fan unit 16 are arranged side by side in the internal cavity 24. The fan unit 16 can draw in air from the surrounding area of the battery protection device 20 through one of the rectangular through-openings 62. The drawn-in air flows around the rechargeable battery 12 and can emerge into an outer surrounding area of the battery protection device 20 at the other of the rectangular through-openings 62.

Figure 4:
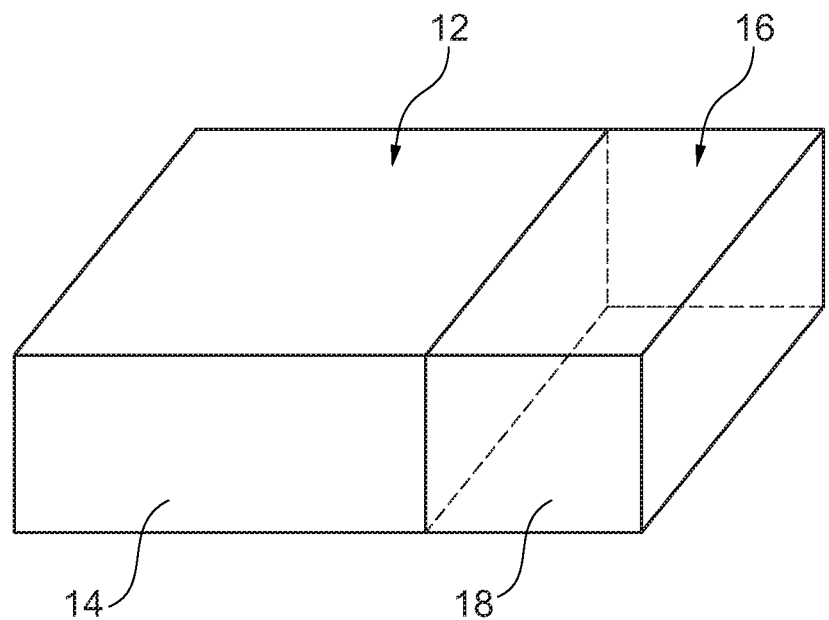
FIG. 4 shows a schematic representation of an arrangement of the rechargeable battery and of the fan unit of the battery module of FIG. 1.
Figure 5:
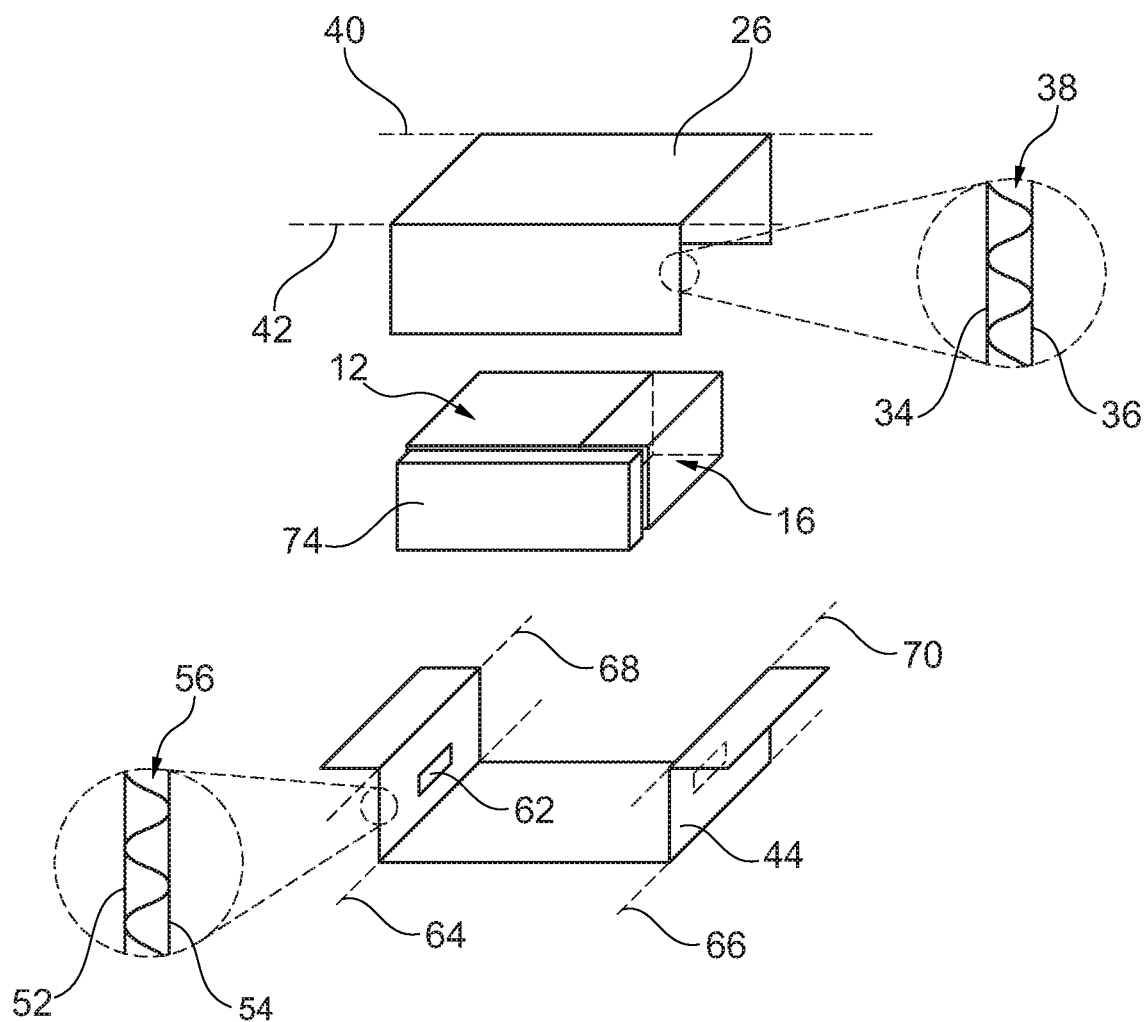
FIG. 5 shows a schematic exploded representation of the battery module of FIG. 1.

FIG. 5 shows a schematic exploded representation of the battery module 10 according to FIG. 1. As can be seen from FIGS. 1 and 5, a rectangular rigid foam plate 74, which can consist of EPP, for example, is provided inside the internal cavity 24 for further mechanical protection of the rechargeable battery 12. The rigid foam plate 74 is situated with one side abutting mechanically against the end sides 14, 18 of the rechargeable battery 12 and of the fan unit 16 (FIG. 4), which are arranged side by side. The other side of the rigid foam plate 74, with the battery protection device 20 in the closed state, is arranged parallel to and directly abutting against an inner side surface of the upper housing portion 26 (FIG. 5).

Figure 6:
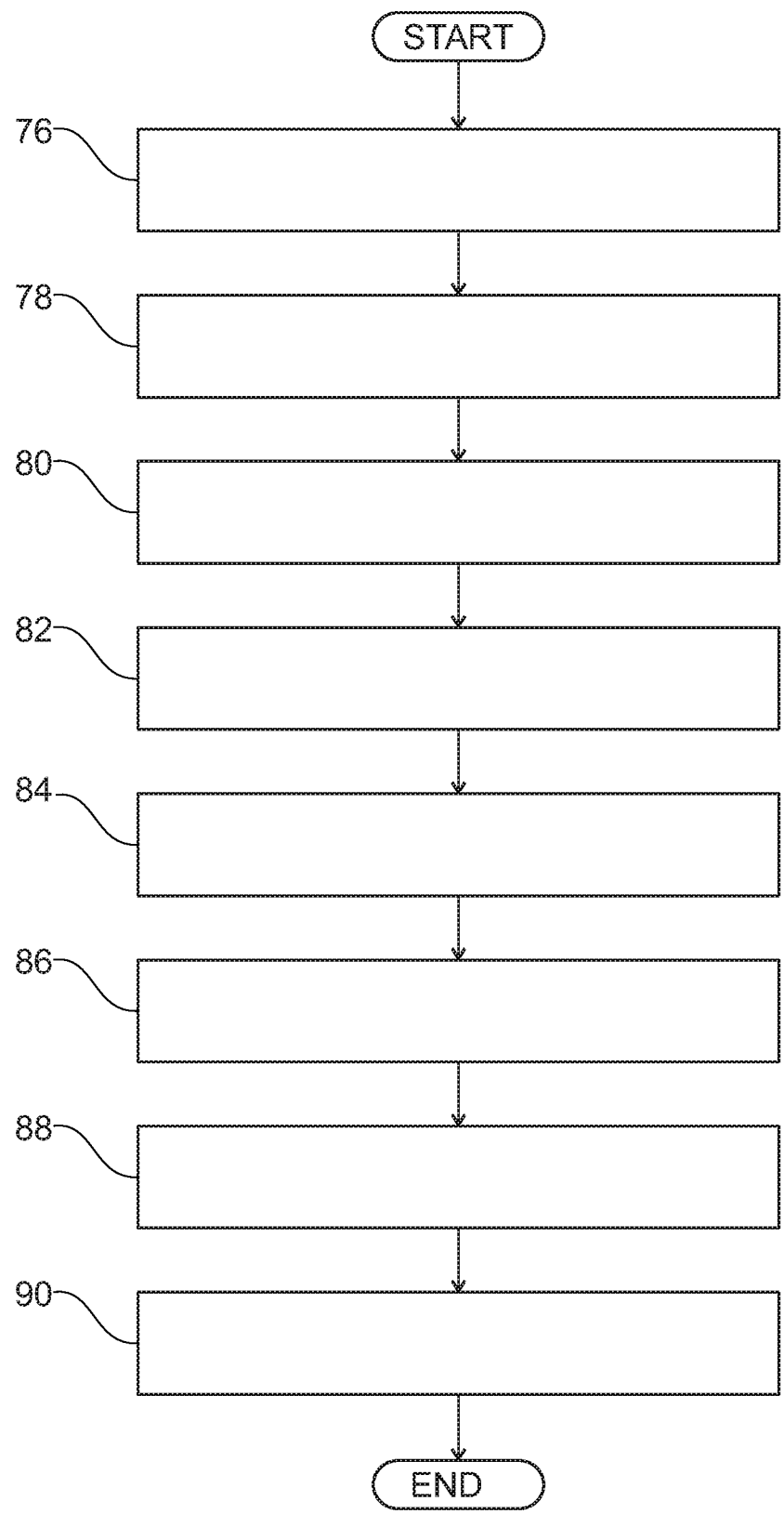
FIG. 6 shows a flowchart of a method or making the battery protection device of FIG. 1.

FIG. 6 shows a flowchart of an example method according to this disclosure. Specifically, the example method is a method of making (i.e., producing or manufacturing) the battery protection device according to FIG. 1. The method is explained with reference to FIGS. 1, 5 and 6.

In a first step, at 76, one or more plate-shaped semi-finished products made of the above-discussed sandwich structure are provided. The plate-shaped semi-finished products are oversized in relation to the required dimensions of the upper housing portion 26 and of the lower housing portion 44 of the battery protection device 20.

At step 78, end parts of a first plate-shaped semi-finished product are bent round at a right angle and in movements directed toward one another, along two bending lines 40, 42 (FIG. 5), which are spaced-apart from one another and parallel to one another, to achieve the inner width 28 of the upper housing portion 26.

In a next step, at 80, the two rectangular through-openings 62 (FIG. 5) are punched out of a second plate-shaped semi-finished product.

In a further step, at 82, end parts of a second plate-shaped semi-finished product are bent round at a right angle and in movements directed toward one another, along two bending lines 64, 66 (FIG. 5), which are spaced-apart from one another and parallel to one another, to achieve the outer width 46 of the lower housing portion 44.

The bent-round end parts of the second plate-shaped semi-finished product are bent round in a connecting step, at 84, at a right angle along bending lines 68, 70, which extend parallel to and are spaced-apart vertically from the bending lines 64, 66 of the preceding bending step 82, in a bending direction which runs in the opposite direction to the preceding bending step 82. In other words, in step 84, the ends are bent away from one another, whereas in step 82 the ends were bent toward one another.

The bent-round end parts of the first plate-shaped semi-finished product are cut to substantially identical lengths in a further step, at 86, to achieve the inner height 32 of the profile form of the upper housing portion 26.

The U-shaped profile of the upper housing portion 26 is cut in a further step, at 88, to achieve the length 30. The U-shaped profile of the lower housing portion 44 is cut to the length 48 in a next step, at 90, to substantially correspond to the inner width 28 of the upper housing portion 26.

The length 30 of the upper housing portion 26 and the outer width 46 of the lower housing portion 44 as well as the length 48 of the lower housing portion 44 and the inner width 28 of the upper housing portion 26 substantially correspond to one another in pairs in such a manner that the upper housing portion 26 and the lower housing portion 44, with the battery housing 22 of the batter protection device 20 in the closed state, are connected together in a press fit. The upper and lower housing portions 26, 44 may further be welded together or connected together using another technique.

It should be understood that terms such as "about," "substantially," and "generally" are not intended to be boundaryless terms, and should be interpreted consistent with the way one skilled in the art would interpret those terms. Further, terms such as "front" and "rear" are used herein with reference to a normal operational attitude of a motor vehicle, and should not otherwise be considered limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
 a battery protection device including a first housing portion and a second housing portion, wherein the first and second housing portions are each made of a sandwich structure and exhibit U-shaped profiles, and wherein the U-shaped profiles of the first and second housing portions face one another to provide an internal cavity, wherein the first housing portion includes a base and opposed side walls providing the first housing portion with the U-shaped profile, wherein the second housing portion includes a base and opposed side walls providing the second housing portion with the U-shaped profile, and wherein the U-shaped profiles of the first and second housing portions are arranged substantially 90° relative to one another such that a length dimension of the base of the first housing portion is arranged substantially 90° relative to a length dimension of the base of the second housing portion.

2. The electrified vehicle as recited in claim 1, wherein:
 the side walls of the first and second housing portions bound the sides of the internal cavity,
 the base of the first housing portion bounds one of the top and the bottom of the internal cavity, and
 the base of the second housing portion bounds the other of the top and the bottom of the internal cavity.

3. The electrified vehicle as recited in claim 1, wherein the first housing portion is a lower housing portion and comprises an overhang protruding substantially perpendicularly from one of the side walls of the first housing portion.

4. The electrified vehicle as recited in claim 1, wherein at least one of the side surfaces of the first housing portion comprises a through-opening.

5. The electrified vehicle as recited in claim 1, wherein:
 a width of the U-shaped profile of the second housing portion substantially corresponds to a length of the U-shaped profile of the first housing portion, and
 a length of the U-shaped profile of the second housing portion substantially corresponds to a width of the U-shaped profile of the first housing portion.

6. The electrified vehicle as recited in claim 5, wherein:
 the length of the U-shaped profile of the first housing portion substantially corresponds to an inner width of the U-shaped profile of the second housing portion, and
 the length of the U-shaped profile of the second housing portion substantially corresponds to an outer width of the U-shaped profile of the first housing portion.

7. The electrified vehicle as recited in claim 6, wherein inner surfaces of the opposed side walls of the second housing portion directly abut a respective end face of the first housing portion.

8. The electrified vehicle as recited in claim 5, wherein an inner height of the U-shaped profile of the second housing portion substantially corresponds to an outer height of the U-shaped profile of the first housing portion.

9. The electrified vehicle as recited in claim 1, wherein the sandwich structures of the first and second housing portions comprise one of (a) a core layer including a metal honeycomb structure, (b) a metal corrugated structure having corrugations extending in the direction of a length of the U-shaped profile of the respective one of the first and second housing portions, and (c) a polymer rigid foam material.

10. The electrified vehicle as recited in claim 9, wherein the sandwich structures of the first and second housing portions predominantly comprise one of (a) expanded polypropylene, (b) aluminum, and (c) steel.

11. The electrified vehicle as recited in claim 1, further comprising at least one foam plate arranged within the internal cavity.

12. The electrified vehicle as recited in claim 1, further comprising a fan unit arranged within the internal cavity.

13. The electrified vehicle as recited in claim 1, further comprising a battery arranged within the internal cavity.

14. The electrified vehicle as recited in claim 13, further comprising an electric machine, wherein the battery is configured to power the electric machine, and wherein the electric machine is configured to provide a rotational output to drive the electrified vehicle.

15. The electrified vehicle as recited in claim 1, wherein:
the length dimension of the base of the first housing portion is the most extended dimension of the first housing portion, and
the length dimension of the base of the second housing portion is the most extended dimension of the second housing portion.

16. The electrified vehicle as recited in claim 1, wherein:
a first plane bisects the base of the first housing portion and extends parallel to the opposed side walls of the first housing portion,
a second plane bisects the base of the second housing portion and extends parallel to the opposed side walls of the second housing portion, and
the first plane passes through the second plane at an angle of substantially 90°.

17. The electrified vehicle as recited in claim 1, wherein a plane extending parallel to the bases of the first and second housing portions passes through the opposed side walls of first housing portion and the opposed side walls of the second housing portion.

* * * * *